United States Patent [19]

Carpenter et al.

[11] Patent Number: 4,902,429
[45] Date of Patent: Feb. 20, 1990

[54] GAS ASSISTED FLOTATION PROCESS

[75] Inventors: Robert K. Carpenter, Herculaneum; Harrison F. Lyman, Jr., Clayton, both of Mo.

[73] Assignee: Redux Corporation, Fenton, Mo.

[21] Appl. No.: 209,173

[22] Filed: Jun. 20, 1988

[51] Int. Cl.⁴ .............................................. L02F 1/24
[52] U.S. Cl. ...................................... 210/704; 210/744
[58] Field of Search .............................. 210/703-707, 210/709, 744, 96.1, 221.1, 221.2

[56] References Cited

U.S. PATENT DOCUMENTS

| | | | |
|---|---|---|---|
| 1,717,223 | 6/1929 | Karlström | 210/703 |
| 2,446,655 | 8/1948 | Lawrason | 210/705 |
| 2,770,365 | 11/1956 | Welsch | 210/704 X |
| 2,874,842 | 2/1959 | Kroftu | 210/703 |
| 3,298,519 | 1/1967 | Hollingsworth | 209/165 |
| 3,399,775 | 9/1968 | Ciaffone | 210/221 |
| 3,430,768 | 3/1969 | Stephens | 210/533 X |
| 3,452,869 | 7/1969 | O'Neill | 210/520 X |
| 3,642,617 | 2/1972 | Brink et al. | 210/205 X |
| 4,022,696 | 5/1977 | Krofta | 210/520 |
| 4,060,481 | 11/1977 | Stoev et al. | 209/170 |
| 4,233,152 | 11/1980 | Hill et al. | 210/703 |
| 4,342,654 | 8/1982 | Lambert | 210/744 |

Primary Examiner—Thomas G. Wyse
Attorney, Agent, or Firm—Haverstock, Garrett and Roberts

[57] ABSTRACT

This invention relates to a gas assisted flotation process and apparatus useful in the separation of solids from liquids in a slurry, such as treated waste waters, paper pulp solution etc. The gas assisted flotation process may be operated on a continuous basis. The upper portion of the main chamber of the apparatus is tapered inward to terminate in an apex which has an opening through which the floated and compressed solids and gas are removed. The apparatus also has a fluid discharge line through which the separated fluids may be removed which also contains a fluid discharge valve which may be opened and constricted intermittently to control the flow of slurry through the system.

9 Claims, 1 Drawing Sheet

GAS ASSISTED FLOTATION PROCESS

This invention relates to a gas assisted flotation process and apparatus for separating solid particles from liquids. The invention is useful in the treatment of industrial waste waters but may also be used in other applications, such as food processing, manufacturing and public and private water treatment systems.

BACKGROUND OF THE INVENTION

Gas assisted flotation (GAF) primarily in the form of dissolved air flotation (DAF) cells have been in use for years as a primary means of separating solids from liquids. In recent years, dissolved air flotation, has found wide acceptance in the treatment and pre-treatment of various waste waters prior to discharge or recycle. The advantages of a flotation process over a sedimentation process for liquid-solids separation are well known and some of them are set forth below. However, one disadvantage common to all dissolved air flotation cells currently in use is the inability to remove the sludge accumulation from the cell without taking significant amounts of the liquid with it.

Dissolved air flotation cells such as described in U.S. Pat. Nos. 3,452,869 and 4,022,695 have competed with gravity sedimentation for the separation of precipitated or other suspended solids from liquids or solutions for a long time.

Dissolved air flotation can have many advantages over gravity sedimentation. One of the greatest is space. Light coagulated-flocculated solids, such as various chemical precipitates, are slow to settle and thicken in their liquid media by gravity alone. It is therefore necessary to build relatively large settling tanks or thickeners to accomplish a good clean separation.

On the other hand a DAF cell or unit that will handle the same flow rate can be much smaller because the rise rate of floc attached to air bubbles is typically four or five times greater than the settling rate of the same floc without air. Therefore, a DAF unit will always be much smaller than a sedimentation unit for the same volume throughput. DAF cells can be operated at high surface loading, thus small and quite shallow units are possible. Another advantage of DAF cells over sedimentation can be fast start-up with steady water quality being achieved quickly. Cost is also favorable in many cases.

One major disadvantage of all existing DAF cell configurations, however, is the inability to separate the floating solids (floc) from their liquid media without removing an excess of liquid. This results in a very dilute sludge, often less than 0.2 percent solids. Such a dilute sludge is not an ideal feed for a filter or de-watering unit. This has been a major drawback to the DAF process for liquids-solids separation since its inception.

Currently there are methods of removing floc from a DAF cell in use, such as an inclined continuous belt where the floc is picked up on the belt and excess water runs back into the cell. The floc can then be scraped off the belt into a receiver outside of the cell. Another available method is to use an inclined screw which is analogous to the a belt system. With the screw system, scoops of various design are in use to make the separation. Still another method involves a centrally-mounted revolving weir in a circular cell where the floc is carried off, but always with a significant amount of liquid. Sometimes rotary paddles or stationary scrapers are used to decrease the amount of solution carried away along with the true floating sludge.

In recent years DAF has been used increasingly in the treatment or pre-treatment of many and varied waste waters, but always there has been a need for the production of a floc with a higher solids content which would create less sludge for disposal and make a more efficient feed for a filter or other de-watering device.

BRIEF DESCRIPTION OF THE INVENTION

In this invention floating solids are separated from the host liquid by concentrating the floating solids into a small area of a gas assisted flotation (GAF) cell and then removing the coagulated floating solids by a continuous process characterized by intermittently raising of the liquid level in the cell in such a manner as to force the floc out through a passage near the top of the cell, with only a negligible amount of the host liquid on which it has floated accompanying it.

The present invention is based on the discovery that the floating solids in a GAF cell can be concentrated by various geometric shapes (such as an inverted funnel or pyramid) and continuous in-flow of solids-bearing liquid into the cell coupled with intermittently restricting the discharge of clarified liquid on a controlled basis which results in elevating the level of the host liquid and forcing the floc upward, toward the apex of the GAF cell. The thickened floc is then discharged out through an exit at or near the apex of the cell. The cell design also preferably incorporates a stilling chamber which allows time for floc formation and growth as well as the reduction of velocity and turbulence in the liquid to be clarified.

Typically, a slurry containing dissolved or dispersed air enters the GAF unit after passing through a pressure relief valve. In normal operation the waste water and solids in the slurry have been chemically treated and saturated with dissolved or dispersed gas prior to being released into the GAF cell.

Depending on the materials being separated, one or more polymers may be injected to improve the floatability of the precipitated or suspended solids.

The slurry then preferably enters the stilling chamber within the GAF cell. This chamber has a dual purpose. The first is to reduce the velocity to the point of a slow non-turbulent flow rate. The second is to provide enough retention time in the chamber to allow optimum coagulation, flocculation, gas bubble and air bubble adsorption and floc growth to take place. Under these parameters the average solids in a host liquid will be conditioned for a very effective separation by flotation. As the conditioned slurry rises within the GAF cell a rapid separation of liquids and solids takes place, the solids with bubbles attached rising into the progressively more constricted upper portion of the GAF cell and clarified liquid leaving the GAF cell via an outflow pipe typically located in the lower portion of the exterior well of the cell. The height of liquids in an overflow pipe may determine the level in the GAF cell where the interface of floating solids and host liquid occurs prior to its being physically raised by increased volumes of liquid in the tank caused, in the preferred application, by the interruption of outflow via the closing or constricting of a valve in the overflow pipe or outflow line. The most efficient setting of this level will vary with different liquid-solids mixtures and must be determined for each application to produce optimum results.

As the separated solids rise toward the top of the GAF cell as a result of gas assisted flotation they are concentrated into a relatively small area by the progressively constricted upper portion of the cell.

Depending on the retention time, the thickness of the bed of floating floc can also be varied. It is this design concept that makes it possible to have a clean separation of true floc from the liquid medium in which it is suspended or carried. This creates the production of a relatively dry and concentrated sludge which makes a greatly improved feed for de-watering as compared with the sludge produced by other known air or gas assisted flotation systems.

Additionally, the solids further de-water by gravity above the level of the host liquid as excess gas channels upward through the floc. Maximum thickening and de-watering of the solids takes place through settlement out of liquids in the progressively more constricted upper portion of the cell above the host liquid. In the new GAF system described in this invention, thickening of the floc takes place above the host liquid as well as in it and produces a more concentrated sludge than is possible in any other known type of air or other gas flotation cell. For optimum operation of this GAF cell the overflow pipe should be sized so as to allow the solution flow to take place at essentially zero velocity head.

Sludge removal from the GAF cell is typically accomplished on a generally continuous basis, controlled by intermittently opening and closing or constricting a liquid discharge valve. When this valve is fully or partially closed the liquid level in the GAF cell will rise as a result of continuing in-flow of solids-bearing liquid and the floating sludge (floc) will start to discharge via overflow into the sludge discharge pipe. When the solution level reaches a pre-set point near the apex of the GAF cell the liquid discharge valve is automatically opened again, thus dropping the liquid level in the GAF cell back to the normal level and thus momentarily stopping the discharge of sludge.

This method of control and operation will insure that the removal of floating solids from the GAF cell is carried out with a minimum of liquid being removed with the solids.

DETAILED DESCRIPTION OF THE INVENTION

Figure 1:
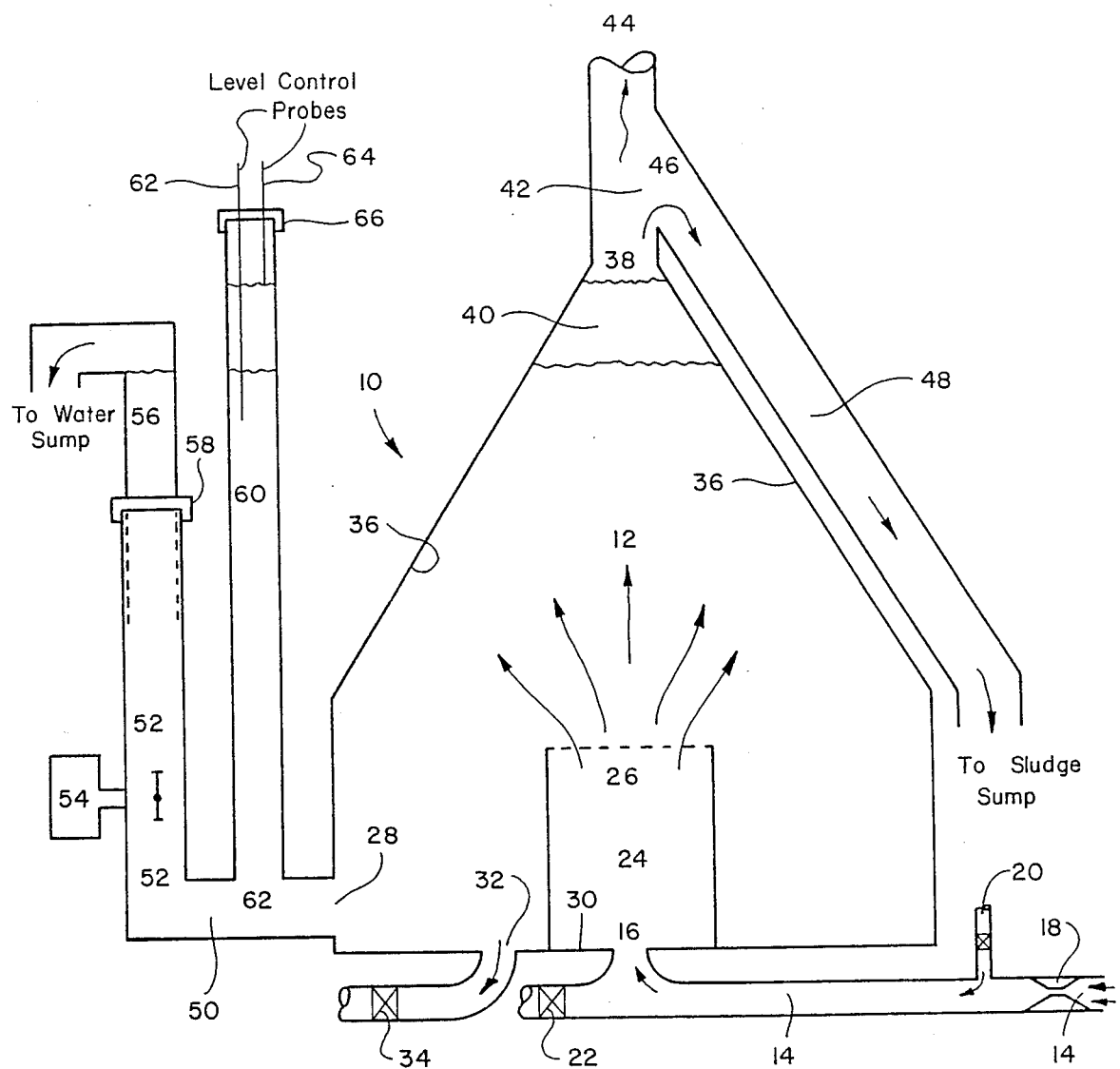
FIG. 1 is a transverse section showing one embodiment of the gas assisted flotation apparatus of the invention.

FIG. 1 shows a gas assisted flotation cell 10 containing main chamber 12. Liquid containing solids particles enters the gas assisted flotation cell 10 through entry pipe 14 and enters main chamber 12 through opening 16. The liquid containing solids particles will generally enter the system under pressure. The pressure will be determined by the optimum operation of the system but the upstream pressure against pressure relief valve 18 will generally be about 60 pounds per square inch but may range from as low as 20 pounds per square inch to as high as 100 pounds per square inch. In some cases a gas diffuser or diffures may be used and the gas injected directly into the chamber at near zero pound per square inch pressure.

In a preferred practice of the invention, chemically treated waste water containing solids particles to be separated in the system will have had air or other gas induced under pressure whereby the gas has been dissolved in the liquid and small compressed bubbles of gas have become incorporated into the masses of solids particles and become attached to the surfaces of such solids particles.

As the treated waste water containing solids particles enters entry pipe 14 under pressure, it passes through pressure relief valve 18 where the pressure is reduced to almost atmospheric pressure, resulting in the rapid formation of gas bubbles which expand, and physically elevate the solids particles to the surface of liquid in the cell. It is preferred to retain just enough pressure to keep the liquid containing solids moving in the system.

An option in practicing the invention is the injection of a polymer system through polymer injection nipple 20 which feeds into entry pipe 14 between pressure relief valve 18 and opening 16. In a conventional application the polymer will be injected through polymer injection nipple 20 at a pressure only sufficient to overcome the residual pressure in entry pipe 14 and insure that the polymer mixes with the chemically treated waste water containing solids particles.

Cut-off valve 22 is included in entry pipe 14 only as a means of bypassing cell 10 in case of malfunction but is otherwise closed to force the liquid into cell 10 through opening 16.

The water or other liquid containing solids particles with expanding gas bubbles attached to their surfaces passes through opening 16 preferably into a stilling chamber 24. Stilling chamber 24 is preferably included to reduce the velocity of the liquid entering cell 10 to the point of a slow non-turbulant flow. Also, stilling chamber 24 is preferably included to provide enough retention time to allow further coagulation, flocculation and gas bubble absorption as well as growth of the flocculants solids particles to take place. Optionally, the slurry will enter stilling chamber 24 through opening 16 at a velocity of approximately 2.5 feet per minute with a flow rate of about 10 gallons per minute and retention time in stilling chamber 24 of approximately 24 seconds. These rates and times are not critical and will vary with the optimization of the system for each liquids/solids separation being treated and each particular cell 10. For example, the velocity may range from as low as 0.5 feet per minute to as much as 5.0 feet per minute or more. The flow rate may range from as low as 0.5 gallons per minute to as much as 100 gallons per minute or more. Retention time in stilling chamber 24 may range from as low as 10 seconds to as much as 60 seconds or more. These flow rates and retention times will depend on the size and configuration of the cell 10 and stilling chamber 24.

The size of stilling chamber 24 may be varied considerably to optimize the operation of a particular cell 10. Stilling chamber 24 should be large enough to create the desirable coagulation and flocculation and air bubble absorption as the flocs of solids particles grows.

Stilling chamber 24 may be cylindrical in shape or it may be any other cross-section configuration such as rectangular, square, or elliptical. The liquid, the bubbles and the forming floc exit stilling chamber 24 into main chamber 12 through stilling chamber opening 26. Stilling chamber opening 26 will generally be unrestricted so that the slurry containing solids particles with gas bubbles can over-flow in all directions to fill main chamber 12. The periphery of stilling chamber 24 may be any desired height but the top should be higher than fluid discharge exit 28 to minimize loss of solids particles. Alternatively, stilling chamber 26 may be replaced in gas assisted floation cell 10 with a baffle plate which extends at least around opening 16 and between opening 16 and fluid discharge exit 28 in a generally perpendicular position from the bottom 30 of main chamber 12. Such baffle plate may extend substantially transverse of main chamber 12 or it may simply partially surround opening 16. The purpose of the baffle plate would be to minimize loss of solids particles through fluid discharge exit 28 before such solids particles have an opportunity to float upward in main chamber 12. However, neither a stilling chamber nor a baffle plate is an essential element of a flotation cell under this invention.

In the preferred embodiment of this invention treated waste water containing solids particles with gas bubbles attached to the surfaces of such particles and gas bubbles adhering thereto are flocculated together so that the bouyancy provided by the gas bubbles will cause the solids particles to move toward the top of the main chamber 12, whereby separation of the solids particles from the fluid is initiated.

Bottom opening 32 in the bottom of main chamber 12 and exit valve 34 are provided only for the purpose of draining the system as, for example, for maintenance.

The upper portion 36 of main chamber 12 slopes upward and inward to apex opening 38 and this is a critical component of the present invention although the angles of convergence and the precise physical configurations of such upper portion 36 are not critical.

As the flocculated solids particles with gas bubbles attached move upward in the liquid toward the apex opening 38 the solids particles tend to congregate in the increasingly constricted upper portion 36 of main chamber 12 which effects further thickening of the rising solids particles which tends to produce a concentrated layer of floated solids. The concentrated solids (floc) will tend to form in a defined layer 40.

The flocculated concentrated solids particles (floc) will typically exit from main chamber 12 through apex opening 38 into upper pipe 42 wherein the gas bubbles will tend to detach from the solids particles and exit from upper pipe 42 through upper pipe opening 44 where such gases may be vented or reclaimed for further use.

Upper pipe 42 has a side opening 46 through which the solids will exit by force of gravity through sludge discharge pipe 48 into a sludge sump (not shown) for discharge or further treatment as appropriate.

A critical element of this invention is a control system which provides for a continuous inward flow of liquid containing solids particles into the system and for the discharge of separated and thickened solids through a sludge discharge point, and for the discharge of clarified fluid through separate fluid discharge point.

In the preferred embodiment referred to herein, as the separated fluid exits from main chamber 12 through fluid discharge exit 28 it enters fluid discharge pipe 50. Fluid discharge pipe 50 projects outward from the periphery of main chamber 12 in generally perpendicular relation thereto and is located generally near the bottom of main chamber 12 and generally horizontal with bottom 30 of main chamber 12. Fluid discharge pipe 50 extends outward from main chamber 12 for a short distance and then turns upward into upper fluid discharge pipe 52.

Upper fluid discharge pipe 52 contains upper fluid discharge valve 54. Valve 54 is critical in the operation of the gas assisted flotation process of this invention because it is used to control the intermittent restriction of discharge of clarified fluid from the system which governs the level of liquid in the upper portion 36 of the cell 12 and thus the discharge of floated solids from the system in the form of relatively liquid free sludge on a continuing basis.

The opening and closing of upper fluid discharge valve 54 can be by manual operation based on visual observance of the formation of flocculated solids particles in defined layer 40. Preferably, upper fluid discharge valve 54 can be placed on a timing cycle. The timing cycle necessary to keep the system operating continuously will be dependent on the composition of the entering liquid containing solids particles. For a typical treatment system, the upper fluid discharge valve 54 may be operated on a cycle of about 1–5 seconds closed and about 59–115 seconds open. Also, it is possible to further control the cycle by only partially opening and closing fluid discharge valve 54. It is also an important part of this invention to operate the system on a continuing basis with an automatic timing device on the upper fluid discharge valve 54 which is actuated to open automatically when the fluid level reaches a pre-set point near the apex opening 38 of the gas assisted flotation cell 10, thus momentarily stopping the discharge of sludge and dropping the liquid level in the main chamber 12 of the cell 10 and dropping the liquid level back to the normal level. The pre-set points contain switches which will respectively actuate a motor (not shown) which will respectively open and close valve 54. These pre-set points will be selected and sequentially timed to optimize through-put and will depend on the nature of the original feed.

Upper fluid discharge pipe 52 will be in mating relationship with overflow pipe 56 through which the clear fluid is discharged into a water sump for further treatment in accordance with established procedures. Overflow pipe 56 optionally works up and down inside upper fluid discharge pipe 52 in mating relationship and is held in position by overflow pipe collar and seal 58.

Another preferred but optional component of gas assisted flotation cell 10 is level control pipe 60 which is connected to fluid discharge pipe 50 through opening 62. Thus, the level of fluid and slurry will rise and fall in the main chamber 12 at the same levels as those to which fluids rise and fall in level control pipe 60. Level control probes 62 and 64 may be inserted through level control collar 66 and respectively connected through switches to acutate the motor which opens and closes upper fluid discharge valve 54 to control the system. This is a preferred system for including automatic controls in the process because the level control probes 62 and 64 can be easily and quickly adjusted to maximize through-put of any particular chemically treated waste water containing solids particles.

In operation a time cycle is chosen and valve 54 is opened and closed by these settings. Thus, the motor actuating valve 54 is opened by probes 62 and 64. This allows automatic adjustment and control for small changes in either the solids content or the flow into the system. This is an important feature of the invention.

EXAMPLE 1

A laboratory apparatus was constructed and operated successfully with a metal hydroxide slurry containing about 0.032 percent by weight of dry solids particles in water. The flow rate was 0.5 gallons per minute. The volume of the main chamber of the cell was 1,144 cubic inches. The retention time in the main chamber was 9.9 minutes. The size of the apex opening was 0.785 square inches.

Air was dissolved in the feed material at a pressure of 60 pounds per square inch. After the feed passed through the pressure relief valve, the system operated at close to atmospheric pressure with just sufficient pump input pressure to maintain a constant flow of 0.5 gallons per minute.

The sludge volume was 1.6% of the feed volume and assayed 2.0% solids. This sludge was a good pressure filter feed and produced a "dry filter cake" which was very easy to handle and was acceptable for landfill.

EXAMPLE 2

The same laboratory apparatus as described in example 1 was used to process treated laundry waters. These tests were also very successful in that the floating solids concentrated to an average of about 1.5% to 2.0% of the feed volume. The water was clear and suitable for recycle in a laundry operation. The sludge was thick and made a good feed for a vacuum drum filter.

EXAMPLE 3

The same laboratory apparatus as described in example 1 was used to process car wash water. This test was also successful as the floating solids concentrated to about 2.0% of the feed volume. The water was grit and solid free and suitable for recycle in a high pressure car wash operation.

Gases which are useful in the practice of this invention include air which is generally used for most purposes because it is available and inexpensive. Other gases which are useful in the practice of the invention are generally common gases which do not easily liquify under operating pressures in the system. Such gases include oxygen, nitrogen, carbon dioxide and other gases having similar characteristics.

The gas is generally injected into the treated feed material prior to entering the gas assisted flotation cell. However, the gas may optionally be added at any point prior to the time the feed material enters the main chamber of the cell. For example, the gas could be injected through a diffuser or diffusers at any point along the entry pipe into the cell or located on the bottom of the cell.

Although it is expected that the gas assisted flotation process of this invention will utilize the input pressure and regulated control of the pressure release valve to control throughput, it is also contemplated that the process may include an auxiliary pumping system which may be installed in the bottom of the main chamber and it is also contemplated that one or more auxiliary stirring devices may be incorporated into the main chamber to create additional bubbles.

Although the upper portion of the main chamber is tapered to form an apex in the top, the angle of the taper is not particularly important and will depend on particular constructions. The angle of the taper from horizontal should always be sufficient to provide a funnel-like effect to move the contents towards the apex. The angle may range from as small as 45 degrees to as much as 75 degrees with about 60 degrees being preferred.

The configuration of the gas assisted flotation cell of this invention will generally be cylindrical and the upper portion will generally be conical because such constructions are generally available in the tank construction industry. However, the invention may also be practical with other types of cell configurations. For example, the cell could be of rectangular configuration and the upper portion could be tapered in pyramidal fashion to form an elongated apex opening. Also, the cell construction could be hexagonal or any other configuration at the option of the installer.

The optional conventional polymer may be catonic, anionic or non-ionic depending on the chemistry of the particular application.

The gas assisted flotation process of this invention is continuous although it is controlled by intermittent opening and closing the fluid discharge valve which controls the fluid levels in the cell and which also thus controls the intermittent discharge of dewatered sludge.

While the invention has been described with respect to preferred specific embodiments, it will be understood that many modifications and variations may occur to those skilled in the art without departing from the spirit and scope of this invention as defined in the claims.

We claim:

1. A continuous process for separating solids particles from a liquid in a slurry comprising injecting a gas into said slurry under sufficient pressure to induce the formation of gas bubbles which tend to attach to said solids particles, passing said slurry containing solids particles and liquid under pressure through a pressure relief valve whereby the pressure on the gas-containing slurry is reduced to a lower pressure sufficient only to keep the slurry system moving with the consequent formation of multiple gas bubbles which tend to attach to the solids particles, passing said slurry into the lower chamber portion of a gas assisted flotation cell where it is retained temporarily to reduce the flow velocity and reduce turbulance to provide sufficient retention time for said solids particles to coagulate and flocculate and to allow time for gas bubbles to attach to and be absorbed in and on said solids particles, thereafter allowing said slurry to enter the main chamber of said gas assisted flotation cell whereby said solids particles with gas bubbles separate from said liquid and float upward in said slurry, floating said solids particles with gas bubbles upward into a narrowing portion of said gas assisted flotation cell as they separate from said liquid which creates a greater concentration of solids particles with gas bubbles and tends to partially dry said solids particles with gas bubbles as they are separated from said liquid, passing said concentrated solids particles with gas bubbles through an opening in the apex of said narrowing portion of said gas assisted flotation cell where the solids particles exit through a discharge line and the gas bubbles exit through a gas line while the liquid phase is being discharged from said gas assisted flotation cell through a discharge line connected to said gas assisted flotation cell, said discharge line for said liquid having incorporated therein a valve whereby the discharge of liquid from said gas assisted flotation cell is periodically reduced or entirely interrupted while said incoming slurry continues to enter said cell without reduction or interruption, thereby causing the liquid level in said cell to rise within the cell, forcing the separating solids particles and gas bubbles upward through the narrowing portion of said cell until they exit through said discharge lines at the apex of said cell with minimum associated liquids, subsidence of the liquid level in said cell being brought about by the periodic reopening of said liquid discharge line controlled to take place prior to the time when said liquid rising in said cell would otherwise flow out of said discharge line for solids particles or said gas line for gas bubbles.

2. The continuous process of claim 1 wherein said lower portion of said cell is a defined stilling chamber.

3. The continuous process of claim 1 wherein said gas assisted flotation includes a polymer injection.

4. The continuous process of claim 1 wherein said fluid discharge pipe has a fluid level control pipe having fluid level control probes.

5. The continuous process of claim 1 wherein said gas is air.

6. The continuous process of claim 1 wherein said gas is oxygen.

7. The continuous process of claim 1 wherein said slurry is selected from treated metal bearing waters, laundry spent water and spent car wash water.

8. The continuous process of claim 1 wherein said gas is injected into said slurry by full steam pressurization, partial steam pressurization or recycle pressurization.

9. A continuous process for separating solids particles from a liquid in a slurry comprising injecting air into said slurry at a pressure of about 0–100 pounds per square inch to induce the formation of air bubbles which tend to attach to said solids particles, passing said slurry containing solids particles in liquid under air pressure through a pressure relief valve whereby the gas pressure is reduced to a pressure sufficient only to keep the slurry system moving with the consequent formation of additional air bubbles which tend to attach to the solid particles, passing said slurry at about atmospheric pressure into a stilling chamber portion of a gas assisted flotation cell where it is retained for a period of from about 10 seconds to about 60 seconds to reduce the flow velocity and reduce turbulence so that said solids particles may coagulate and flocculate and the air bubbles attached to the surface of said solids particles may be absorbed in the forming flocs and absorbed on the surface of said solids particles, thereafter allowing said slurry to enter the main chamber of said gas assisted flotation cell whereby said solids particles with gas bubbles separate from said liquid and float upward in said slurry, allowing said solids particles with gas bubbles to float upward into the narrowing portion of said gas assisted flotation cell wherein the angle of the narrowing portion will be about 45–75 degrees from horizontal so that the separating solids particles may float easily upward into said narrowing portion of said gas assisted flotation cell to create a greater concentration of solids particles with gas bubbles which tends to partially dry said solids particles with gas bubbles as they separate from said liquid, passing said concentrated solids particles with air bubbles through an opening in the apex of said narrowing gas assisted flotation cell whereby the solids particles exit through a discharge line and the air bubbles exit through a gas line while the liquid phase is being discharged from said gas assisted flotation cell through a discharge line connected to said gas assisted flotation cell near the bottom, said discharge line for said liquid having incorporated therein a valve whereby the discharge of liquid from said gas assisted flotation cell is periodically reduced or entirely interrupted while said incoming slurry continues to enter said cell without reduction or interruption, thereby causing the liquid level in said cell to rise within the cell, forcing the separating solids particles and gas bubbles upward through the narrowing portion of said cell until they exit through said discharge lines at the apex of said cell with minimum associated liquids, subsidence of the liquid level in said cell being brought about by the periodic reopening of said liquid discharge line controlled to take place prior to the time when said liquid rising in said cell would otherwise flow out of said discharge line for solids particles or said gas line for gas bubbles.

said continuous process being controlled by a fluid discharge valve which in turn is controlled by a pair of level control probes and a timer which maintains the continuous flow by acutating the opening and closing of said fluid discharge valve on a cycle ranging from about 1 second closed to 59 seconds open to about 5 seconds closed to about 115 seconds open.

* * * * *

UNITED STATES PATENT AND TRADEMARK OFFICE
CERTIFICATE OF CORRECTION

PATENT NO. : 4,902,429
DATED : February 20, 1990
INVENTOR(S) : Robert K. Carpenter and Harrison F. Lyman, Jr.

It is certified that error appears in the above—identified patent and that said Letters Patent is hereby corrected as shown below:

Column 10, Line 39, "." should be --,--.

Signed and Sealed this

Sixth Day of August, 1991

Attest:

HARRY F. MANBECK, JR.

Attesting Officer

Commissioner of Patents and Trademarks